Aug. 27, 1968 D. McLACHLAN, JR 3,398,634
MICROSCOPE
Filed Aug. 27, 1964 4 Sheets-Sheet 2
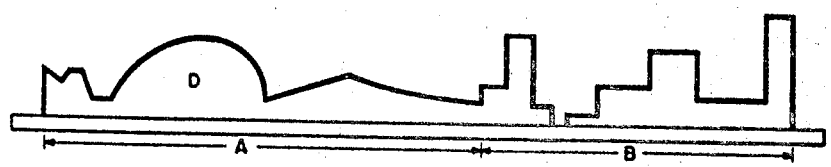
FIG_2
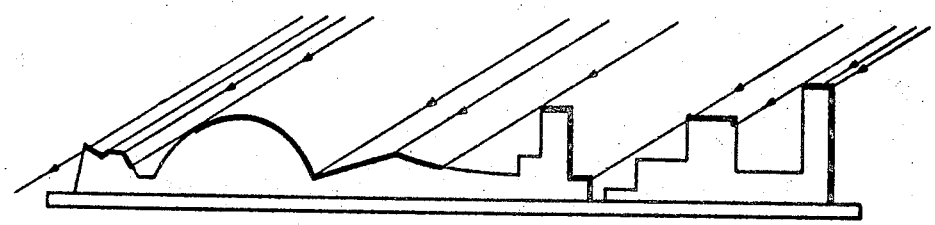
FIG_2A
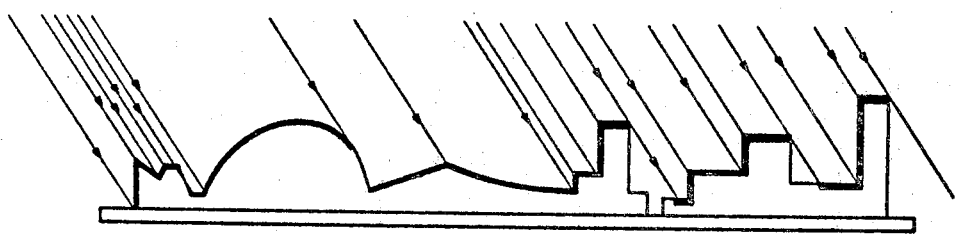
FIG_2b
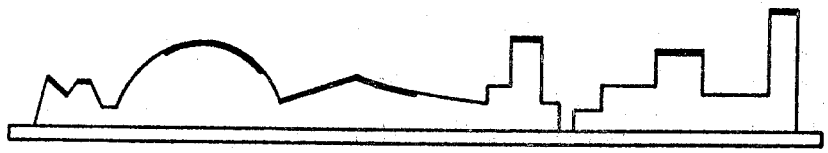
FIG_2c
INVENTOR.
Dan McLachlan Jr.
BY
Anthony D. Cunano

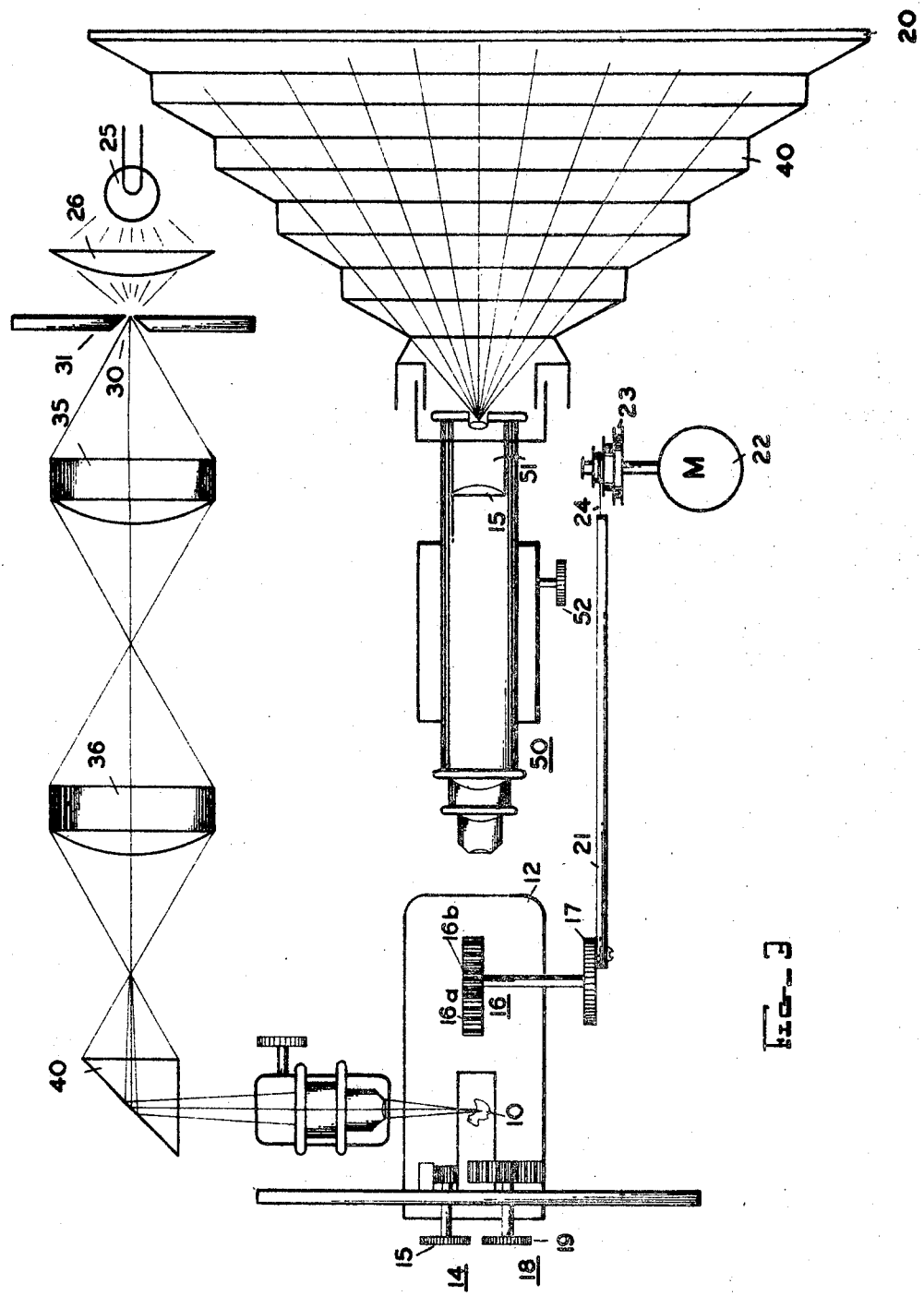

Aug. 27, 1968

D. McLACHLAN, JR 3,398,634

MICROSCOPE

Filed Aug. 27, 1964

INVENTOR.
Dan McLachlan, Jr.
BY
Anthony D. Cennamo

United States Patent Office 3,398,634
Patented Aug. 27, 1968

3,398,634
MICROSCOPE
Dan McLachlan, Jr., Columbus, Ohio, assignor to The Board of Trustees of the Ohio State University, Columbus, Ohio
Filed Aug. 27, 1964, Ser. No. 392,479
14 Claims. (Cl. 88—24)

ABSTRACT OF THE DISCLOSURE

A microscope optical system to increase the useful depth of observation of an object to many times the focal depth of the lens system being used. The object is illuminated only at its focal plane while the object is being scanned through that plane. Thus, the out-of-focus parts of the object are always in darkness.

From the inception of microscopy dating back to the days of Kepler and Descartes, the problem of focal depth has plagued artisans in the use of lenses at high magnification. At least one prior art system made an attempt at improving the resolution in depth by scanning the sample through the focal plane in a direction parallel to the axis of the lens. With this procedure every part of the sample will sometime come into focus; however, this encountered two other difficulties. The first is that each of the out-of-focus points is magnified differently—resulting in a background that is a record of conflicts. The background problem was overcome by synchronously moving the object in such a manner as to make the out-of-focus and the in-focus points come into register. This, however, led to the second difficulty in that the out-of-focus images become cumulative during exposure to produce a milky background.

The present invention corrects the above difficulties through a unique manner of illuminating the object in its focal plane together with scanning of the object to attain high resolution at great depths. That is, the principle of the microscope of the present invention is that the object is illuminated only at the focal plane while the object is being scanned through that plane. Thus, the out-of-focus parts of the object are always in darkness.

It is accordingly a principal object of the present invention to provide a new method and means of microscopy for increasing the focal depth of observation of an object.

A further object of the invention is to eliminate from being illuminated the background—or, out-of-focus part of the image, under observation.

Another object of the invention is to magnify only that part of the image under observation that is in focus.

Still another object of the present invention is to provide a system of microscopy for viewing extremely small objects of fine texture at high magnification in focus for the complete depth of the object.

Other objects and features of the present invention will become apparent from the following detailed description when taken in conjunction with the drawings in which:

FIGURE 2 is an imaginary object in cross-section;

FIGURE 2a is an imaginary object in cross-section with that portion illuminated shown in heavy lines;

FIGURE 2b is an imaginary object in cross-section that part which is visible as viewed in the direction of the arrows;

FIGURE 2c that part which is both illuminated and unobstructed;

FIGURE 3 is a diagrammatic plan view of a preferred constructed embodiment; and

Figure 4:
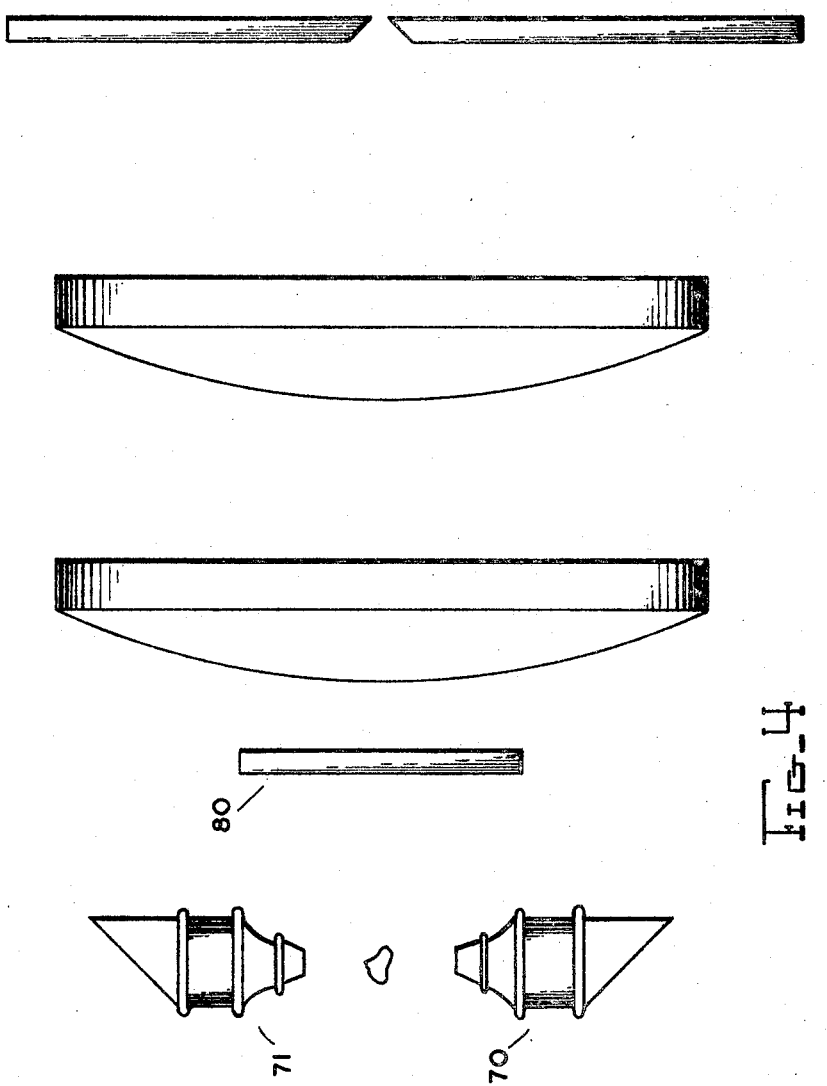

FIGURE 4 is a diagrammatic plan view of a preferred arrangement for illuminating the sample's two sides.

Figure 1:
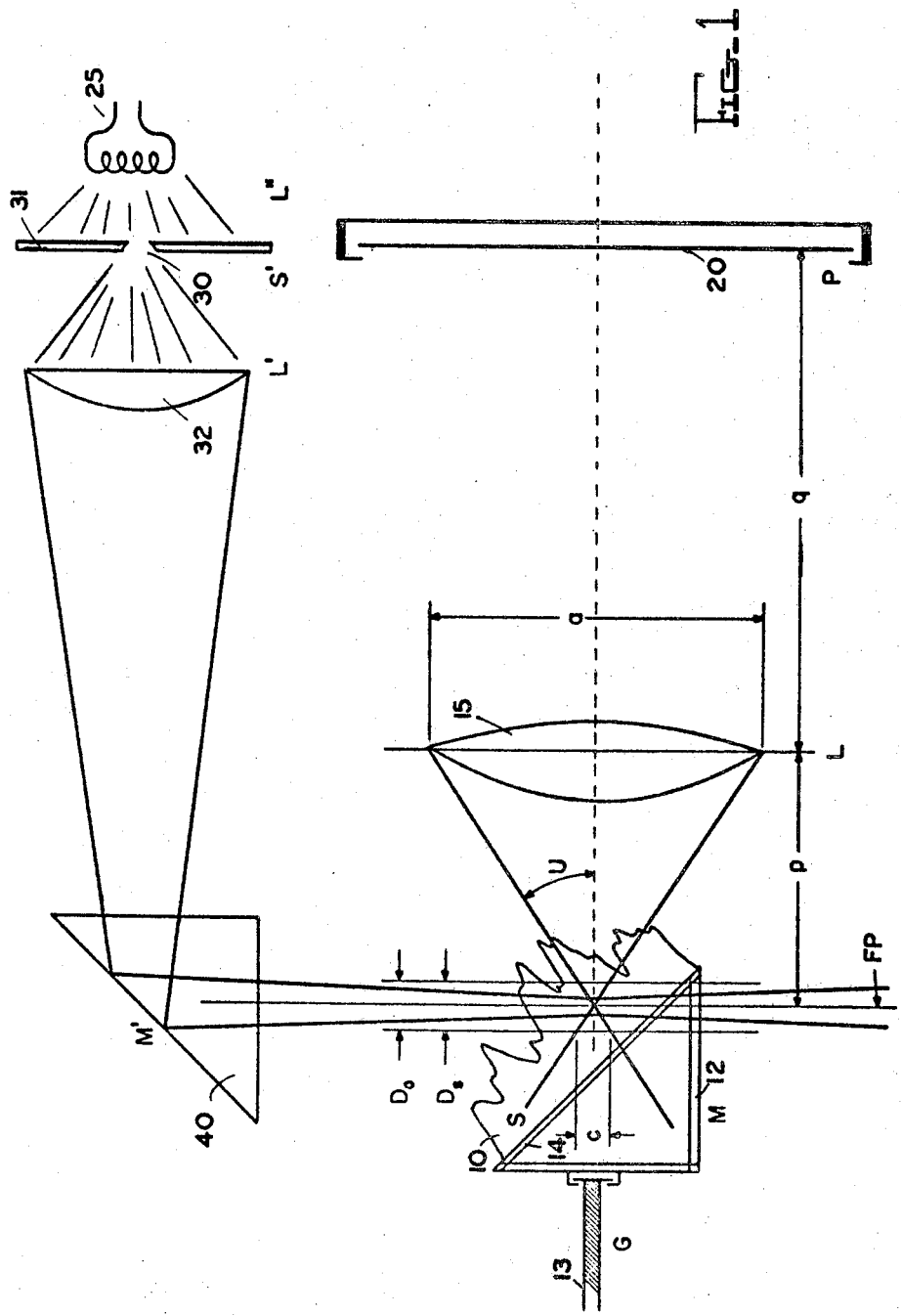
FIGURE 1 is a schematic illustration of the principles of the deep focus microscope of the present invention.

Referring now specifically to FIGURE 1, there is generally shown a schematic representation of a preferred embodiment comprising a sample object 10 for viewing, a lens 15 and a photographic plate 20. The object 10, illustrated as having an irregular shape, is fixedly mounted on a block 12 for positioning by means 13 relative to the lens 15 and prism 40. The lens 15 has a diameter $a$ and a focal length $f$.

In the theory, the distance $p$ from the lens 15 to the focal plane FP and the distance $q$ from the lens 15 to the plate 20 are related by the equation:

$$\frac{1}{f} = \frac{1}{p} + \frac{1}{q} \tag{1}$$

and the magnification is $$M = q/p \tag{2}$$

while the resolution on the focal plane FP is $$h = \lambda/2\eta \sin U \tag{3}$$

Since the human eye can tolerate a circle of confusion of about 0.0125 cm. or 200 lines per inch under the best conditions, there is a circle of confusion $c$ which is all that a microscope needs to attain at a given magnification M.

$$c = 0.0125/M \tag{4}$$

and this value $c$ is also related to the angle U measured from the optical axis to the periphery of the lens 15 and to an important quantity $D_o$, the optical focal depth. Since $$c/D_o = a/2p \tag{5}$$

then we have an equation for the tolerated focal depth $D_o$, $$D_o = .025 \, p/aM_T \tag{6}$$

If a sample were infinitely thin, the sample could be placed on the FP plane of FIGURE 1, and the ultimate results predicted by Equation 3 could be attained. However, for all practical samples, the depth of the sample, heretofore, had to be kept equal to or less than $D_o$ expressed in Equation 5. In actual practice, in metallurgy this is achieved by polishing the specimens (an fractography and other problems that are difficult to study); in biology and histology, the sample is sliced thin such as by a microtome; in the study of suspensoids, such as blood, the liquid is placed between two glass plates and pressed; the mineralogist, at great cost, grinds the specimens until they are thin; and so on. But no technique prior to the present invention has made it possible to take micro-photographs of insects, bacteria, extremely small crystals; woven textiles, broken surfaces of metals, or such small objects of fine texture at high magnification in focus for the complete depth of the object.

In the upper part of FIGURE 1, again referring thereto, there is shown that part of the system that includes a light source 25, a light obturator 31 having a slit 30, a lens 35 and a mirror-prism 40. In operation, the light from the slit is passed as a thin zone of light to the mirror-prism 40. The light is reflected from the prism 40 to the sample object 10 in a direction perpendicular to the axis of the lens 35 and within the zone $D_o$ representing the focal depth. If the entire lens system and apparatus is held fixed, that is, with the illuminated zone coincident with the focal zone, while the sample is scanned through a distance (or depth) $D_M$ mechanically, then we have a ratio of "mechanical depth" to focal depth of $$R_{MO} = D_M/D_o$$

If, however, we have a slit depth $D_s$ (see FIGURE 1) that is greater than $D_o$, the resolution is not ultimate and $$R_{MS} = D_M/D_s$$

A constructed preferred embodiment shown in plan view in FIGURE 3 includes apparatus that comprises a light source 25. The illuminating system is in principle the same as that for measuring differences in elevation on the surfaces of samples of uneven contour. The light from source 25 is passed through the slit 30 of the obturator 31. A satisfactory slit 30 was produced by spraying flat-black paint on a microscope slide and cutting a line in the paint with a new razor blade. As measured by a Bausch and Lomb Filar microscope Ramdsen eyepiece A 1.5 the two best slits were relatively uniform in width and were $2.4 \times 10^{-4}$ and $1.76 \times 10^{-4}$ cm. wide. With an optical system that reduces the dimensions to one-twentieth, $D_s$ values ranging down to $1.3 \times 10^{-5}$ or $0.8 \times 10^{-5}$ are obtained and are adequate for magnifications as high as 400 or 500.

The lenses 35 and 36 are conventional projection lenses and serve to project the light on the mirror prism 40. The lens 35, similar to the lens 15, is of optical microscope quality due to the requirement of the accuracy with which the slit width $D_s$ must be impinged on the sample.

As indicated above, the light is reflected from the prism 40 to the sample object 10 in a direction perpendicular to the axis of the projection lenses 35 and 36.

The traveling stage 12 supporting the object to be illuminated further includes attachments for adjusting the relative position of the sample 10 with the zone of illumination.

Adjustment of the sample 10 is affected in the vertical direction by the rack and pinion arrangement 14 through the knob 15. Adjustment of the sample 10 is effected in the horizontal direction by the rack and pinion 18 through the knob 19. Adjustment in a direction for moving the sample parallel to the microscope axis is effected by the rack and pinion 16 through the knob 17. To sweep the object back and forth through the zone of illumination (as described hereinafter) there is attached to knob 17 an arm 21 by means of screws 21a and 21b. The arm 21 at its other end is attached by a thin wire belt 21 to a cluster of pulleys. The pulleys, in turn, are driven by a motor 22. The rate at which the object is swept through the zone of illumination is, of course, related to the size of the pulleys 23 and the speed of the motor 22. Specifically, the pinion 16b on the rack 16a of the elevator has a one-fourth inch diameter so that when the microscope is tilted to its horizontal position, the sample object 10 moves 0.0055 centimeter per degree of rotation of the gnarled knob. The knob 17 is attached to an arm 21 having an adjustable length from two inches to four inches, permitting the sample 10 to move from 0.000055 centimeter per centimeter of motion of the end of the arm to 0.00022 centimeter per centimeter. The motion of the arm 21 is actuated by a motor 22 running one revolution per minute with a wire 24 over a cluster of pulleys 23 of a size ranging from ¾, ½, ¼, ⅛, and 1/16 inch in diameter. This arrangement facilitates scanning the sample at variable rates from 0.00165 to 0.08 centimeter per second smoothly so that a microphotograph can be taken in one sweep. Other mechanical means and arrangements for scanning the specimen is within the scope of the invention.

The microscope tube 50 supporting the lens arrangement 15 for viewing the illuminated object is focused by movement of the knob 52. This, in turn, positions the microscope tube in a direction parallel to its axis.

The eyepiece lens 15 directs the illuminated image through the dark bellows 60 to the utility means or photographic film 20. If a projection screen were substituted for the film 20, the bellows would, of course, be eliminated.

Table 1 (at end hereof) shows the useful magnifications which might be desired in the first column labeled $M_T$, fellowed in columns 2, 3, 4, and 5 by F focal length, NA the numerical aperture which is sin U and $a/2p$, the tangent of U. $M_e$ is the power of the eyepiece and BL the bellows-length. Under these chosen conditions, the depth of focus $D_o$ as computed from Equation 6 is shown in column 8. The depth of mechanical scan $D_M$ shown in column 9 is computed in centimeters on the grounds that we wish the depth of view to be equal to the width of the field and that magnification will bring this width to 5 inches on a 4 x 5″ photographic film $$D_M = \frac{5 \times 2.54}{M_T} \qquad (7)$$

Also, we used the approximate Equation 6

$$M_T = M_o M_e (BL)/10 \qquad (8)$$

In order to demonstrate the working principles of the microscope, a piece of dendritic bismuth about two and one-half inches square and having block-like recesses in it about one-half inch deep was mounted 45° to the axis of a 50 mm. lens and at a distance of 55 mm. A photograph of this material was taken at a magnification of about two while it was being uniformly illuminated by parallel light streaming in at right angles to the axis of the lens. The bright points on the sample produce circles of increasing diameter as the distance from optimum focus increases, so that the circles of confusion can almost be measured with a ruler. A slit of thickness $D_s$ of the three millimeters was directed upon that portion of the sample that was in focus and at right angles again to the axis of the lens. It was noted that the out-of-focus areas were in total darkness and thus not recorded, while the areas most nearly in focus were relatively well resolved. By reducing the slit depth $D_s$ the illumination to about one millimeter before scanning through $D_M$ of about 40 millimeters, a great improvement in results was noticed.

The image viewed with the microscope of the invention is analogous to that viewed by a helicopter pilot of a mountain terrain by moonlight. FIGURE 2 shows a cross-section of an imagined mountain range incorporating a dome D in a conventional terrain A and a plateau section B. FIGURE 2b shows the directions of the moon's rays and the heavy lines depict the only parts not left in darkness by shadows. FIGURE 2c shows by arrows the pilot's lines of sight and the heavy lines depict the only parts of the mountains not obstructed from view by other parts. (In order to make this illustration fuly analogous to the present situation, the lines of sight are perpendicular to the moon's rays.) Since visibility depends upon both illumination and non-obstruction, there is left only the heavily lined portions shown in FIGURE 2d which the pilot can possibly expect to see.

It is observed that in the plateau section B of FIGURE 2, only the tops can be seen. This is what was actually found with the dendritic bismuth tests mentioned above, since this dendrite happened to grow in a form closely resembling a pueblo vilage and only the roofs could be photographed. The dome D in FIGURE 2 is more representative of the minute objects that may be viewed with the microscope of the invention. This suggests that the orientation of the object is important.

In the illustrations of FIGURES 1 and 2, the illumination is from only one direction; however, samples may be illuminated from more than one direction by suitably placing small mirrors 70 and 71 on the stage 12 in an arrangement as shown in FIGURE 4. The mirrors are oriented so as to reflect the light across and within the focal zone. A light guard 80 prevents illumination directly from the source.

In viewing transparent objects, like small quartz crystals or clear synthetic fibers, it was noted that light entering the object is "piped" to all parts of the object emerging most strongly at ends, edges, and corners, thus producing illumination that is out of focus. To overcome this reradiation, the objects should first be aerodized or mirror finished to make their surfaces opaque.

It is apparent that the scanning motion through the depth $D_M$ need not necessarily be parallel to the axis of the lens 35. The direction of movement may be at almost any angle or even a non-straight line. It has been found, however, that these motions produce distortions in the image but without impairing resolution.

A further modification of this system of the invention may include two or more arrangements suitably positioned in order that stereographic pictures may be taken to give the illusion of depths.

An interesting fact is that since all parts of the object are equal distances from the lens while being photographed, this method gives isometric pictures, not perspective pictures.

Although the method and the bulk of discussion are illustrated with radiation in the vissible region of the spectrum, it is applicable to infrared, ultraviolet, electron (mirror or reflection), and ion bombardment microscopes or the use of any form of radiation where scattering and focusing of radiation is involved.

where $U$ is the angle of the periphery of said lens from its optical axis.

5. A microscope as set forth in claim 4 wherein a tolerable circle of confusion $c$ is in the order of $$c=0.0125/M$$

related to the focal depth $D_0$ in accordance with $$c/D_o=a/2p$$

for a tolerated focal depth $D_0$ $$D_o=.025\ p/a\ M_T$$

6. A microscope as set forth in claim 4 wherein said means of adjusting the focal length of said workpiece comprises moving said workpiece through a depth $D_M$ which is a ratio of depth of movement to the focal depth.

7. A microscope as set forth in claim 4 wherein said

TABLE 1.—WORKING DATA

| (1) | (2) | (3) | (4) | (5) | (6) | (7) | (8) | (9) | (10) | (11) |
|---|---|---|---|---|---|---|---|---|---|---|
| Final Magnification | Power of Objective | Focal Length | Numerical Aperture | Lens diameter÷twice object distance | Power of Eyepiece | Bellows length | Depth of focus | Depth of scan | Resolution | Ratio of 9 to 8 |
| $M_T$ | ($M_o$) | (F, mm.) | (NA) | (a/2p) | ($M_e$) | (BL, in.) | ($D_o \times 10^5$ cm.) | ($D_M$, cm.) | ($h \times 10^5$ cm.) | ($D_M/D_o$) |
| 10 | 2 | 48 | 0.08 | 0.08 | 5 | 10 | 1,560 | 1.27 | 31 | 81.4 |
| 25 | 3.5 | 30 | 0.09 | 0.09 | 10 | 7 | 656 | 0.51 | 28 | 91.7 |
| 50 | 5 | 25 | 0.14 | 0.14 | 10 | 10 | 178 | 0.25 | 18 | 141 |
| 100 | 10 | 16 | 0.30 | 0.31 | 10 | 10 | 40.5 | 0.13 | 8 | 325 |
| 200 | 10 | 16 | 0.30 | 0.31 | 20 | 10 | 20.2 | 0.06 | 8 | 297 |
| 300 | 20 | 8 | 0.60 | 0.75 | 20 | 7.5 | 5.5 | 0.04 | 4 | 730 |
| 400 | 20 | 8 | 0.60 | 0.75 | 20 | 10 | 4.1 | 0.03 | 4 | 732 |
| 500 | 20 | 8 | 0.60 | 0.75 | 20 | 12.5 | 3.3 | 0.02 | 4 | 605 |

What is claimed is:

1. A microscope comprising: a light source, means for confining the illumination from said source, a condensing lens for projecting said confined illumination, a mirror prism for reflecting said illumination in a direction perpendicular to the axis of said condensing lens and within a given zone, utility means, a lens for projecting light reflected from a workpiece to said utility means, and means for adjusting the focal length of said projected light whereby said zone of illumination is confined to the focal zone of said workpiece.

2. A microscope as set forth in claim 1 wherein the distance $p$ from said lens, projecting light from said workpiece, to the focal plane FP of said workpiece, said lens having a focal length $f$, and wherein the distance $q$ from said lens to said utility means are related by the equation $$\frac{1}{f}=\frac{1}{p}\frac{1}{q}$$

3. A microscope as set forth in claim 1 wherein the distance $p$ from said lens, projecting light from said workpiece, to the focal plane FP of said workpiece, said lens having a focal length $f$, and wherein the distance $q$ from said lens to said utility means are related by the equation $$\frac{1}{f}=\frac{1}{p}\frac{1}{q}$$

and the magnification is $$M=q/p$$

4. A microscope as set forth in claim 1 wherein the distance $p$ from said lens, projecting light from said workpiece, to the focal plane FP of said workpiece, said lens having a focal length $f$, and wherein the distance $q$ from said lens to said utility means are related by the equation $$\frac{1}{f}=\frac{1}{p}\frac{1}{q}$$

and the magnification is $$M=q/p$$

while the resolution on the focal plane FP is $$h=\lambda/2n\ \sin U$$

means of adjusting the focal length of said workpiece comprises means for scanning said workpiece through a depth $D_M$ which is a ratio of depth of movement to the focal depth.

8. A microscope as set forth in claim 1 further comprising two or more light sources and means for illuminating said workpiece from more than one direction.

9. A microscope as set forth in claim 1 further comprising means for adjusting the relative direction of said workpiece with respect to said focal zone.

10. A microscope as set forth in claim 1 wherein said light source, condensing lens, and mirror prism are duplicated and alternately positioned to provide stereographic image reflection.

11. A microscope as set forth in claim 1 wherein said utility means is a camera for making pictures of said workpiece.

12. A microscope as set forth in claim 1 wherein said utility means is a projection screen for projecting said light image from said workpiece.

13. A microscope comprising: a radiation source means for confining the radiation from said source, a condensing lens for projecting said confined radiation, a mirror prism for reflecting said radiation in a direction perpendicular to the axis of said condensing lens and within a given zone, utility means, a lens for projecting radiation reflected from a workpiece to said utility means, and means for adjusting the focal length of said projection whereby said zone of radiation is confined to the focal zone of said workpiece.

14. A microscope as set forth in claim 13 wherein said radiation source is of the class comprising infrared, ultraviolet, electron, mirror, electron reflection and ion bombardment.

References Cited

UNITED STATES PATENTS 1,169,843  2/1916  Low _____ 88—24
2,351,753  6/1944  Flint et al. _____ 88—24 X NORTON ANSHER, *Primary Examiner.*

R. A. WINTERCORN, *Assistant Examiner.*